United States Patent
Yamada et al.

(10) Patent No.: US 7,496,071 B2
(45) Date of Patent: Feb. 24, 2009

(54) MOBILE NODE, SERVER, AND COMMUNICATION SYSTEM

(75) Inventors: Mariko Yamada, Tokyo (JP); Yukiko Takeda, Tokorozawa (JP); Takehiro Morishige, Hachioji (JP); Katsunori Takahashi, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 601 days.

(21) Appl. No.: 11/041,994

(22) Filed: Jan. 26, 2005

(65) Prior Publication Data

US 2006/0018273 A1    Jan. 26, 2006

(30) Foreign Application Priority Data

Jul. 20, 2004   (JP)  .............................. 2004-210920

(51) Int. Cl.
*H04J 3/24*   (2006.01)
(52) U.S. Cl. ........................................ 370/331; 370/349
(58) Field of Classification Search ............... 370/349, 370/395.53, 352, 389, 392, 328, 338, 331–334, 370/401, 400; 455/422.1
See application file for complete search history.

(56) References Cited

U.S. PATENT DOCUMENTS

| | | | | |
|---|---|---|---|---|
| 7,092,696 B1* | 8/2006 | Hosain et al. | ............... | 455/405 |
| 2002/0022486 A1* | 2/2002 | Chen | ........................ | 455/452 |
| 2004/0105420 A1* | 6/2004 | Takeda et al. | ............... | 370/349 |
| 2004/0142657 A1* | 7/2004 | Maeda | ...................... | 455/11.1 |
| 2005/0055406 A1* | 3/2005 | Singhai et al. | ............. | 709/206 |

OTHER PUBLICATIONS

Johnson, D., et al, "IP Mobility Support in IPv6", Network Working Group, Standards Track, Jun. 2004 pp. 1-165.

* cited by examiner

*Primary Examiner*—Chirag G Shah
*Assistant Examiner*—Nima Mahmoudzadeh
(74) *Attorney, Agent, or Firm*—Reed Smith LLP; Juan Carlos A. Marquez, Esq.

(57) ABSTRACT

Since, in Mobile IP, the correspondence of one Mobile Node home address and a care-of address is assumed to be one to one, it is not possible to associate multiple care-of addresses with one home addresses, select an appropriate care-of address from among these and dynamically modify the forwarding destination. In the invention, the binding update sent by the Mobile Node to the Home Agent is extended in order to make it possible to also report the application ID at the same time. The Home Agent selects an appropriate care-of address, based on the application ID.

14 Claims, 19 Drawing Sheets

FIG. 3A

BINDING CACHE TABLE 213

| HOME ADDRESS (301) | CARE OF ADDRESS (302) | APPLICATION ID (303) |
|---|---|---|
| 3ffe:3333::10 | 3ffe:2222::10 | 11111, UDP |
| 3ffe:3333::10 | 3ffe:2222::20 | 22222, UDP |
| 3ffe:3333::10 | 3ffe:2222::30 | 33333, TCP |
| 3ffe:3333::20 | 3ffe:2222::40 | 44444, TCP |
| 3ffe:3333::30 | 3ffe:2222::40 | 55555, UDP |
| ⋮ | ⋮ | ⋮ |
| ⋮ | ⋮ | ⋮ |

FIG. 3B

BINDING CACHE TABLE 213

| HOME ADDRESS (301) | CARE OF ADDRESS (302) |
|---|---|
| 3ffe:3333::10 | 3ffe:2222::10 |
| 3ffe:3333::10 | 3ffe:2222::20 |
| 3ffe:3333::10 | 3ffe:2222::30 |
| 3ffe:3333::20 | 3ffe:2222::40 |
| 3ffe:3333::30 | 3ffe:2222::40 |
| ⋮ | ⋮ |
| ⋮ | ⋮ |

FIG. 3C

APPLICATION ID TABLE

| ADDRESS (305) (304) | APPLICATION ID (303) |
|---|---|
| 3ffe:3333::10 | 11111, UDP |
| 3ffe:3333::10 | 22222, UDP |
| 3ffe:3333::10 | 33333, TCP |
| 3ffe:3333::20 | 44444, TCP |
| 3ffe:3333::30 | 55555, UDP |
| ⋮ | ⋮ |
| ⋮ | ⋮ |

APPLICATION LIST

| ADDRESS | APPLICATION ID |
|---|---|
| 3ffe:3333::10 | 11111, UDP |
| 3ffe:3333::10 | 22222, UDP |
| 3ffe:3333::10 | 33333, TCP |
| 3ffe:3333::20 | 44444, TCP |
| 3ffe:3333::30 | 55555, UDP |
| : | : |
| : | : |

BINDING LIST

| DESTINATION | CARE OF ADDRESS | HOME ADDRESS |
|---|---|---|
| 3ffe:2222::1 | 3ffe:2222::10 | 3ffe:3333::10 |
| 3ffe:2222::1 | 3ffe:2222::10 | 3ffe:3333::10 |
| 3ffe:2222::1 | 3ffe:2222::10 | 3ffe:3333::20 |
| : | : | : |
| : | : | : |
| : | : | : |

BINDING UPDATE MESSAGE

BINDING ACKNOWLEDGEMENT MESSAGE

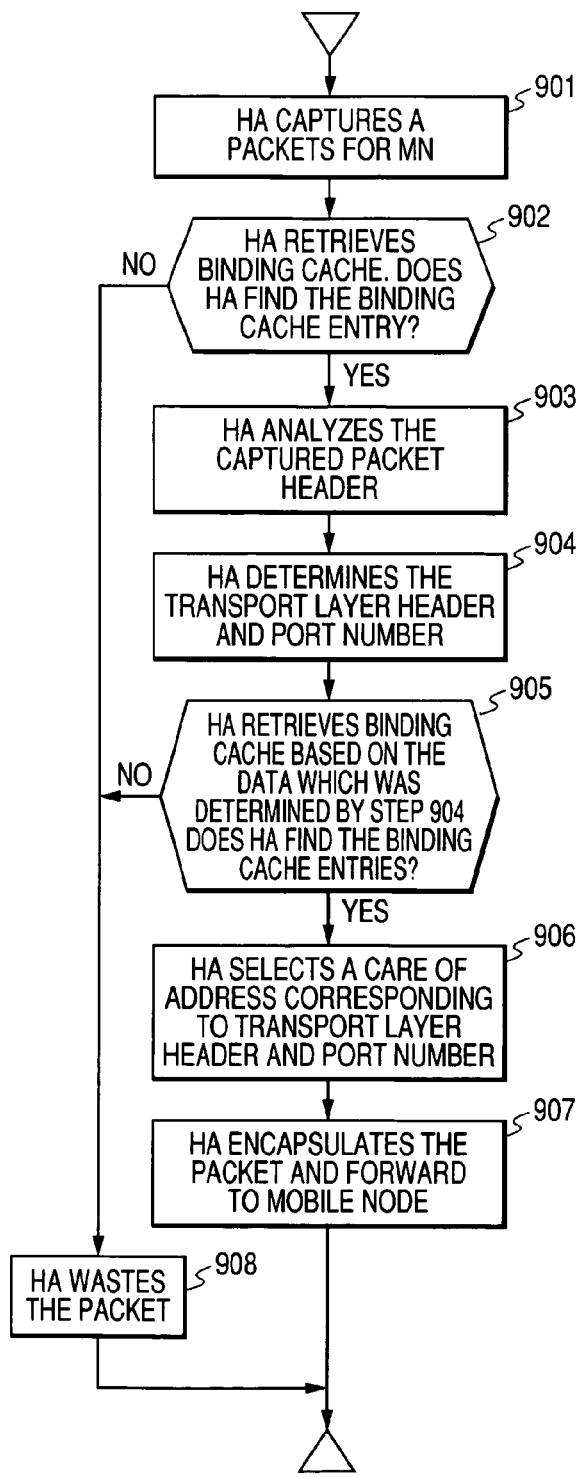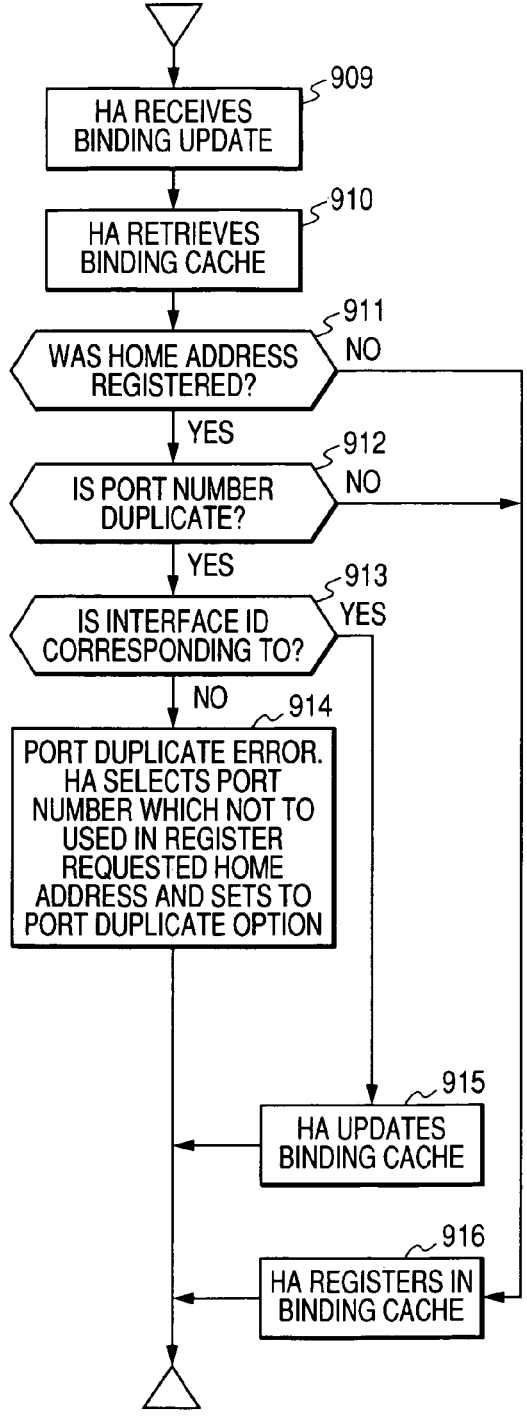

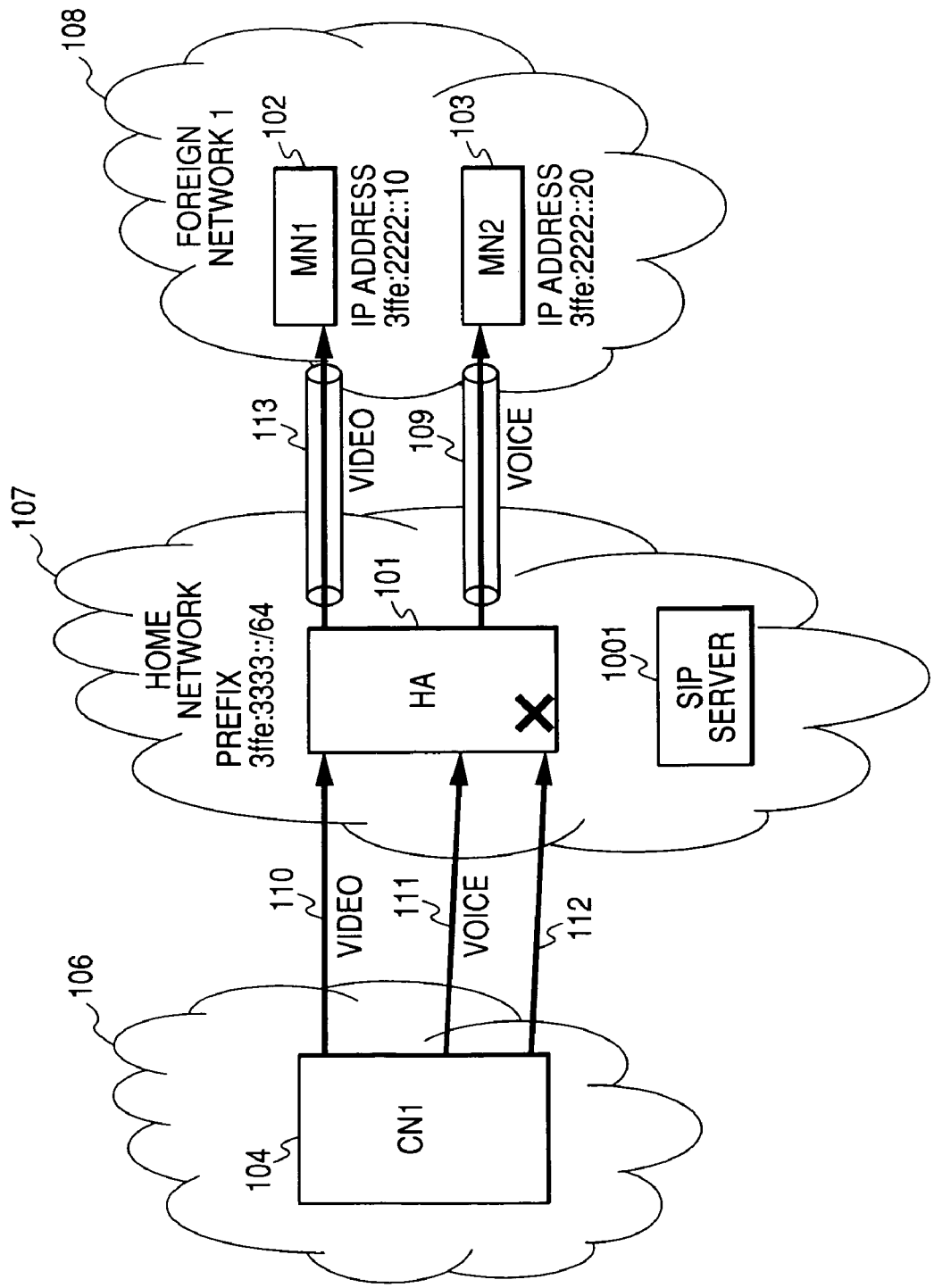

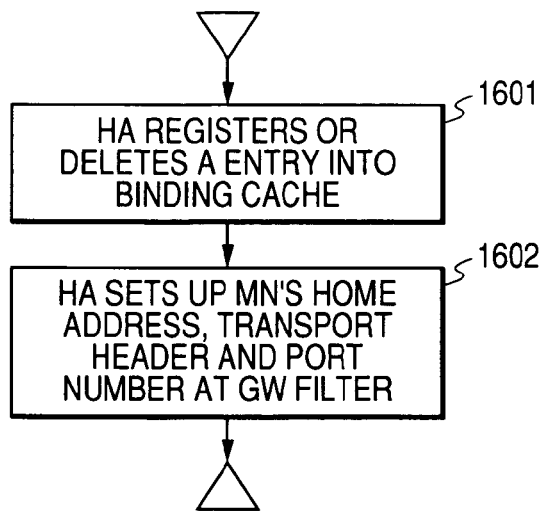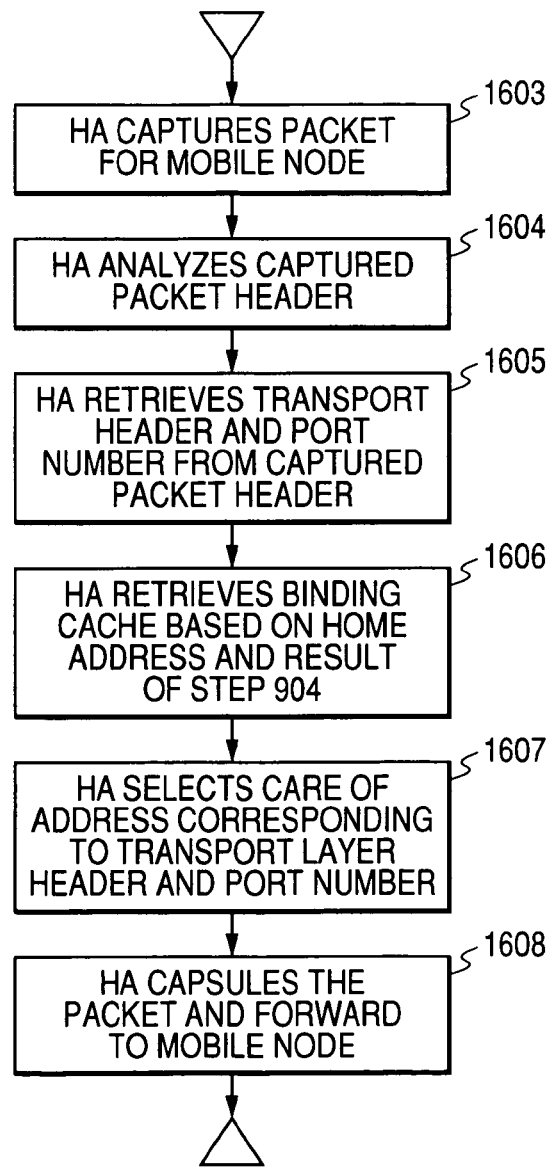

MOBILE NODE, SERVER, AND COMMUNICATION SYSTEM

INCORPORATION BY REFERENCE

The present application claims priority from Japanese application JP2004-210920 filed on Jul. 20, 2004, the content of which is hereby incorporated by reference into this application.

BACKGROUND OF THE INVENTION

1. Field of the Invention

The present invention is concerned with a communication system using mobile IP and pertains in particular to a mapping method for home addresses and care-of addresses in the Home Agent.

2. Description of the Related Art

In the document "IP Mobility Support in IPv6" (David B. Johnson, draft-ietf-mobileip-ipv6-24.txt, December 2003) under examination in the Internet Engineering Task Force (IETF), hereinafter called "Mobile IP", a terminal communicating with a Mobile Node sends an IP (Internet Protocol) packet with the destination IP address set to the home address of the Mobile Node. The IP packet routed to the home network of the Mobile Node is captured by the Home Agent of the Mobile Node, encapsulated, and forwarded to the movement destination foreign network. In order to encapsulate the packet and forward it to the Mobile Node, the Home Agent receives in advance a binding update from the Mobile Node and manages the correspondence relationship between the home address of the Mobile Node and its IP address acquired in the foreign network (below called the "care-of address"). In this way, it becomes possible for the Mobile Node to receive, in the foreign network, the IP packet having as its destination the home address.

In addition, regarding packet filtering, product development of gateway devices performing packet filtering by explicitly setting the IP address and port number and protocol is underway.

SUMMARY OF THE INVENTION

In Mobile IP art, the correspondence of the home address and the care-of address of one Mobile Node is assumed to be one to one. For that reason, a method which associates one home address with several care-of addresses, selects an appropriate care-of address from among these, and forwards it, is not clearly defined. It is an object of the present invention to provide, in a communication system based on Mobile IP, an address mapping method in the communication system, the Mobile Node as well as in the Home Agent, which method associates one home address with multiple care-of addresses, selects an appropriate care-of address from among these, and forwards it.

In order for the above-mentioned object to be attained, the Mobile Node registers multiple care-of addresses in the Home Agent which selects an appropriate care-of address from these and forwards the packet.

As a result of this, it is possible to map, with mobility, multiple pieces of equipment to one home address. Also, the forwarding destination can be dynamically modified in the Home Agent. In addition, it is possible to filter packets with the Home Agent and thus to improve the security of the Mobile Node.

Other objects, features and advantages of the invention will become apparent from the following description of the embodiments of the invention taken in conjunction with the accompanying drawings.

BRIEF DESCRIPTION OF THE DRAWINGS

FIGS. 3A, 3B, and 3C are conceptual diagrams explaining the structure of the binding cache table.

FIGS. 9A and 9B are flow chart diagrams of the binding cache registration process and the address selecting process of the Home Agent.

FIG. 10 is a conceptual diagram of a network in which the present invention is implemented, including cooperation with a SIP server.

FIGS. 16A and 16B are flow chart diagrams explaining the processes of the Home Agent cooperating with a gateway and implementing the present invention.

DESCRIPTION OF THE EMBODIMENTS

Below, the implementation modes of the present invention will be described in detail.

1. First Embodiment

The present invention will be explained using an example in which multiple Mobile Nodes share the same home address. E.g., the present implementation mode is valid in television conference systems, contents delivery systems and the like, when combining a stereophonic or other dedicated voice receiving device with a dedicated video receiving device such as a high-definition display to build a high-quality video and voice reception system. In this case, since the respective care-of addresses of the voice receiving device and the video receiving device correspond to a single home address, the communicating party need not be aware of the addresses of each receiving device. As a result of this, it is possible to treat the video and voice receiving system as one device.

Figure 1:
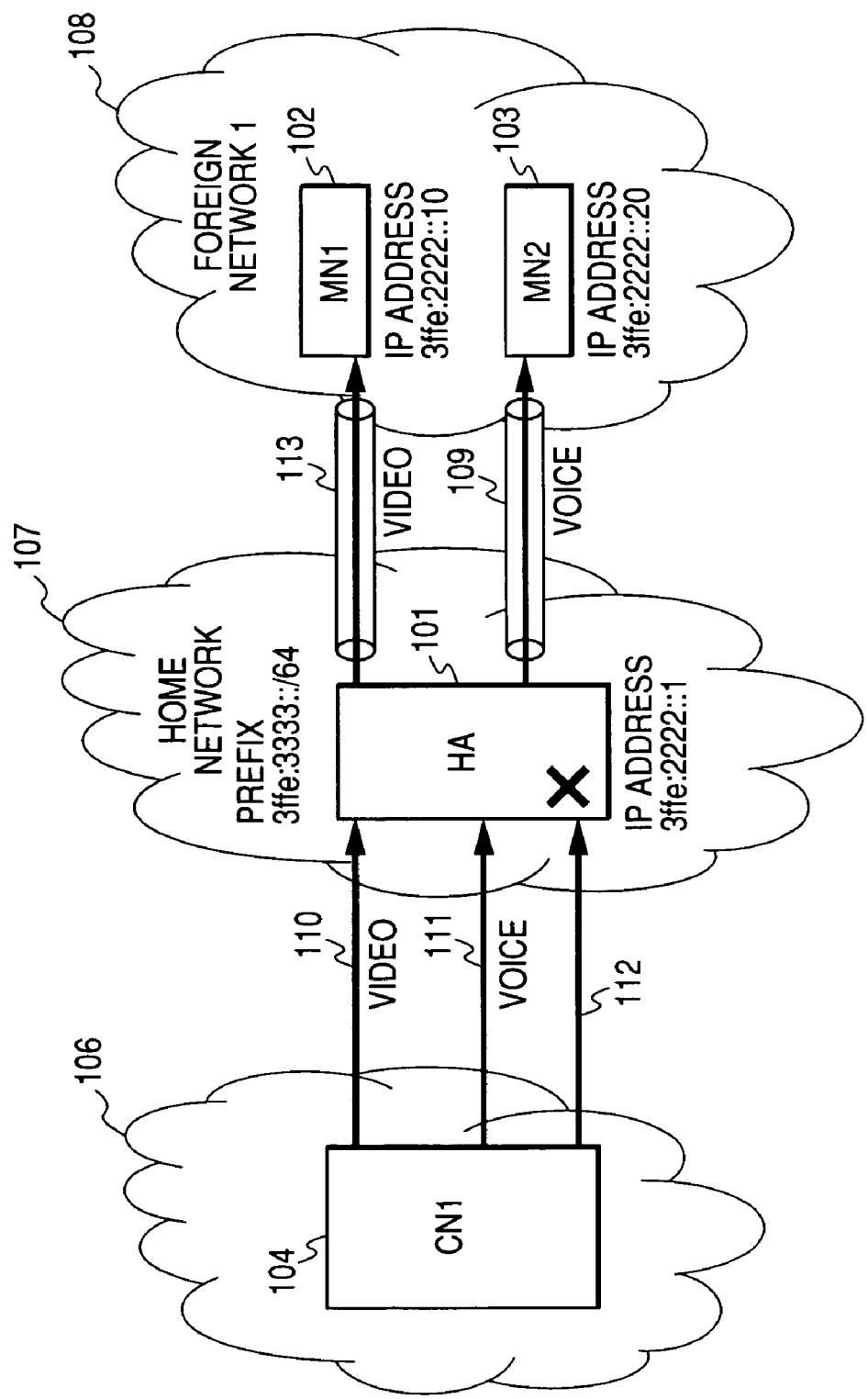
FIG. 1 is a conceptual diagram showing a network in which the present invention is applied.

FIG. 1 is a figure showing the configuration example of a Mobile IP communication system implemented with the present invention. The Mobile IP communication system is composed of a Home Agent 101, Mobile Nodes 102, 103, a terminal 104 communicating with the Mobile Nodes, a network 107 to which the Home Agent of the Mobile Nodes is attached, a foreign network 108 being the movement destination network of the Mobile Nodes, the network 106 to which the terminal 104 communicating with the Mobile Nodes belongs, and the like.

The home network 107, foreign network 108, and network 106 to which terminal 104 communicating with the Mobile Nodes is attached are connected with each other by using the Internet Protocol.

Figure 2A:
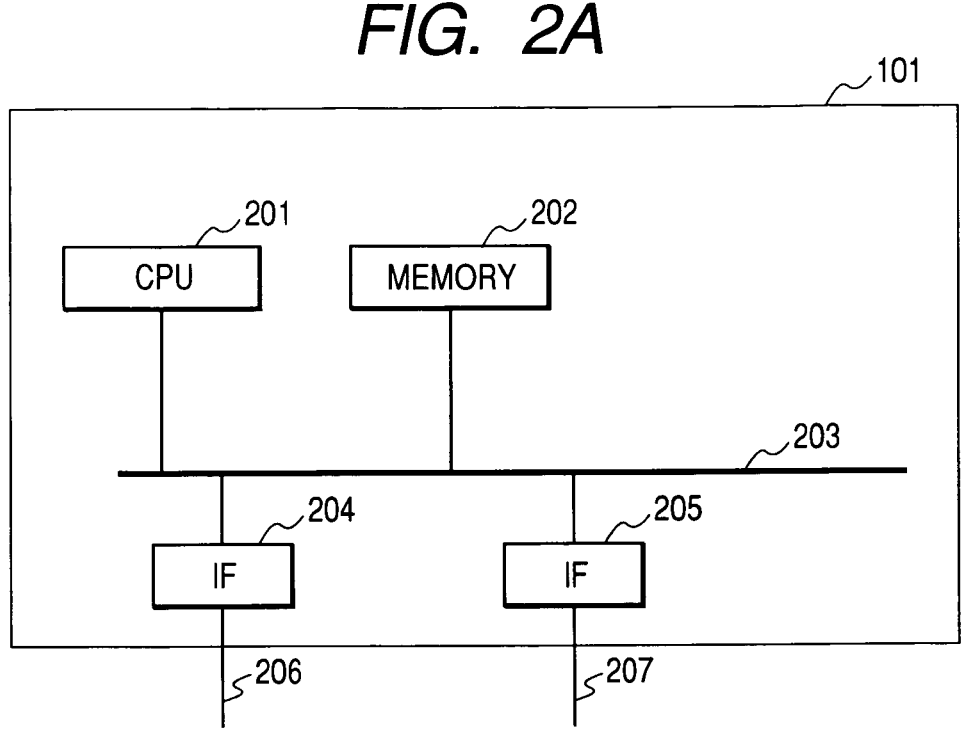
FIGS. 2A and 2B are block diagrams showing the internal structure of the Home Agent used in the present invention.

FIG. 2A is a configuration example of a Home Agent device 101. A Central Processing Unit 201 (CPU) executes various application programs and the Operating System (OS). The programs used in the execution by CPU 201, various application programs, and data used in each program are stored in a memory 202. The CPU 201 and memory 202 are connected through a bus 203. Interface portions 204, 205 output data supplied by CPU 201 and memory 202 to external equipment and supply data supplied by the external equipment to CPU 201 and memory 202. The interface portions 204, 205 accommodate communication lines 206, 207 and perform communication with other equipment.

The memory 202, in addition to a basic OS 209, has a Mobile IP process 208. The basic OS 209 has a sending and receiving process 214 performing the processing of IP packet transmission and reception and a tunneling process 215 performing IP packet encapsulation and decapsulation.

Figure 2B:
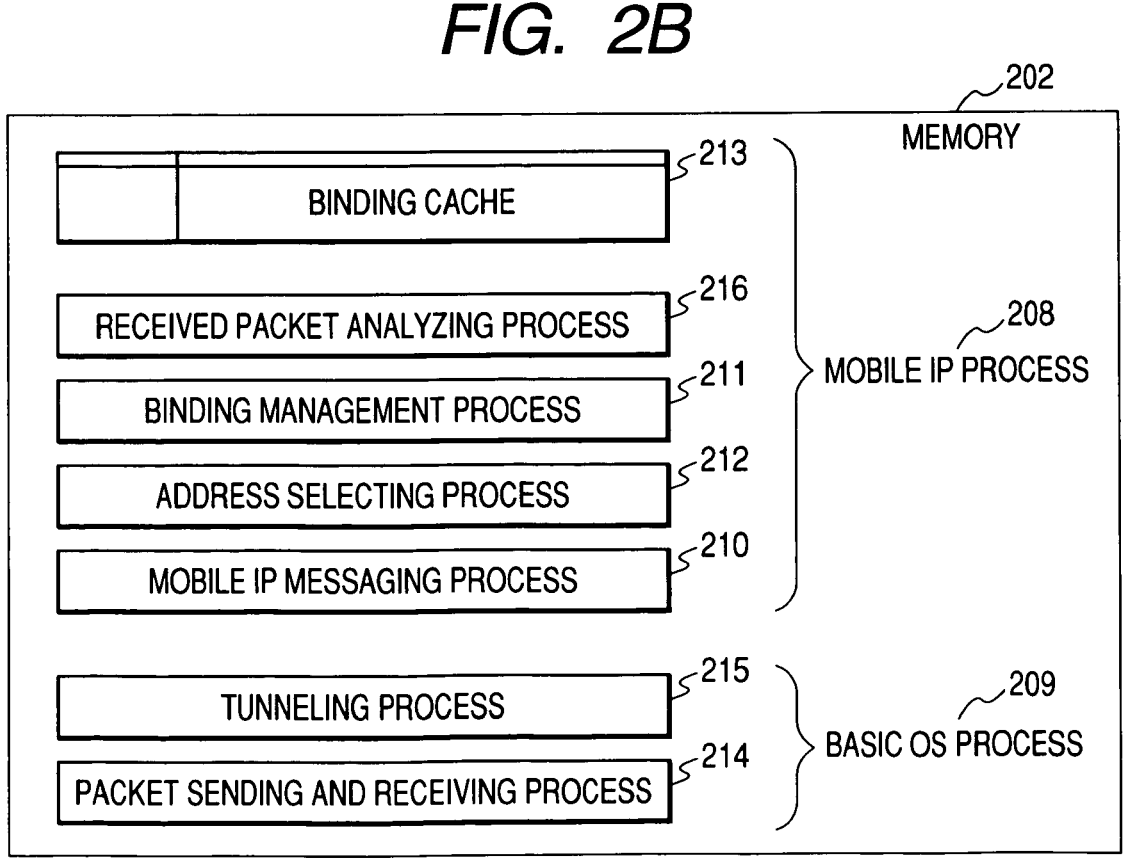

FIG. 2B shows the programs (processes) and data stored in memory 202 of Home Agent 101. Since Home Agent 101 functions by using these programs and data, this is to say that this figure is also showing the functional blocks of Home Agent 101. The Mobile IP process 208 has a Mobile IP messaging process 210, a binding management process 211, an address selecting process 212, a binding cache table 213, and a received packet analyzing process 216.

The Mobile IP messaging process 210 manages binding update messages, as well as Mobile IP messages for binding acknowledgements (below called "binding acks"), binding errors, and the like.

The binding management process 211 manages the binding cache table 213 holding the correspondence relationships of the care-of addresses and the home address of the Mobile Node.

The address selecting process 212 selects an appropriate care-of address in binding cache table 213, in case multiple care-of addresses are registered.

As shown in FIG. 3A, the binding cache table 213 includes at least home addresses 301, care-of addresses 302, and application identifiers (ID) 303. Also, as shown in FIGS. 3B and 3C, the binding cache table 213 may be composed of the home addresses 301 and the care-of addresses 302, and an application ID table 305 may hold, independently of binding cache table 213, the application IDs 303, and addresses 304 associated with the application IDs.

The received packet analyzing process 216 performs a header analysis of the packet received in the Mobile IP process and forwarded to the Mobile Node, by analyzing the protocol type, the port number and so forth, of the transport layer of the header.

Figure 4A:
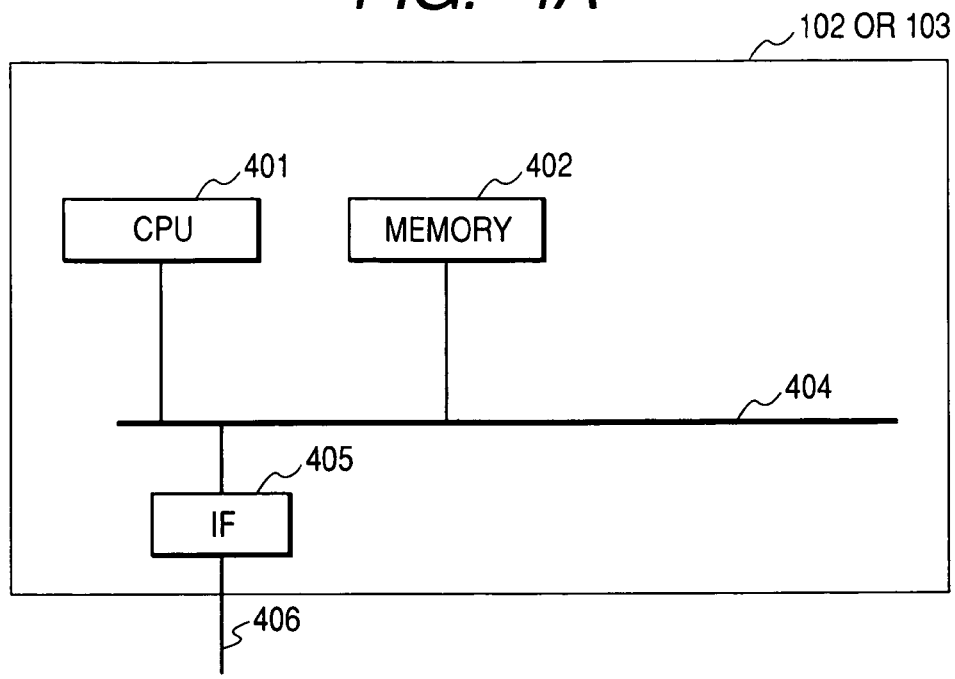
FIGS. 4A and 4B are block diagrams showing the internal structure of a Mobile Node used in the present invention.
Figure 4B:
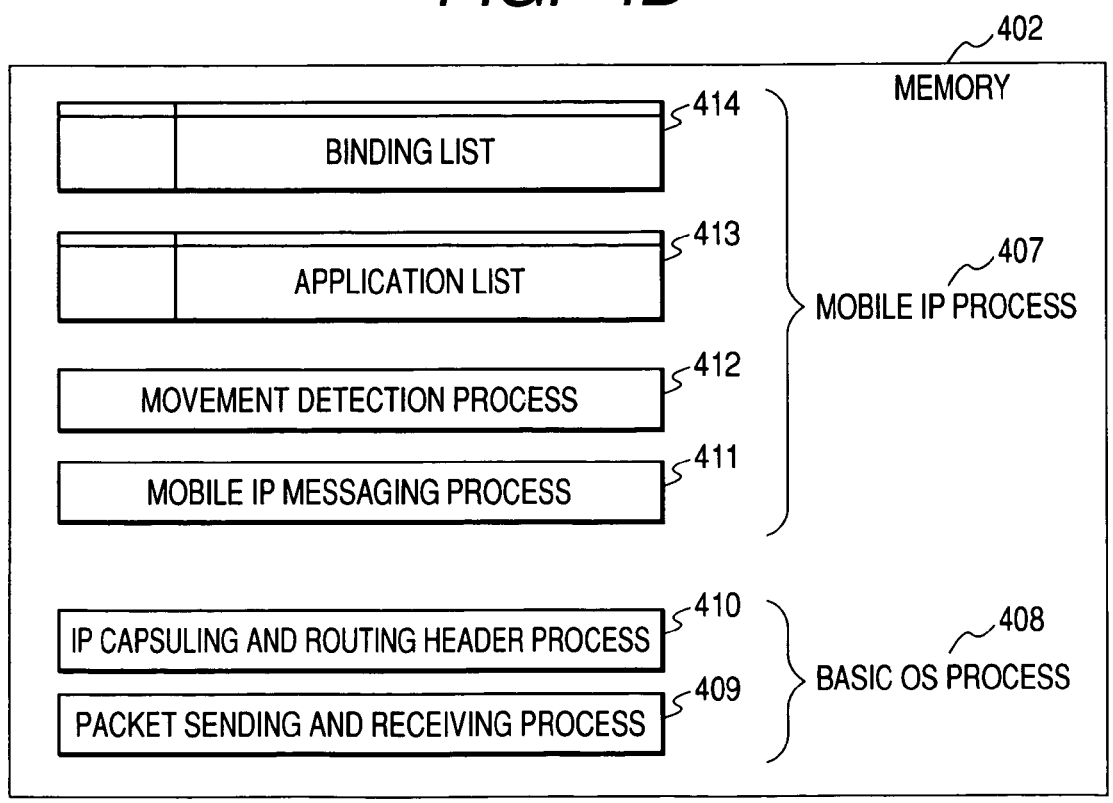

FIG. 4A is a configuration example of the Mobile Node devices 102, 103. The Mobile Nodes 102, 103 are composed of a CPU 401, a memory 402, and an interface 405 accommodating a communication line 406, these being connected through a bus 404. FIG. 4B is a configuration example of memory 402. In memory 402 of the Mobile Nodes 102, 103, there is a Mobile IP process 407 in addition to a basic OS 408. The basic OS 408 has a packet sending and receiving process 409 and a tunneling and routing process 410 performing processing of packet encapsulation, decapsulation, and routing.

The Mobile IP process 407 is composed of a Mobile IP messaging process 411 performing Mobile IP messaging of binding updates and the like, a movement detection process 412 detecting the movement of the Mobile Nodes, an application list 413 managing the correspondence relationship between the addresses and the application ID of the Mobile Nodes, and a binding list 414 managing the transmission destinations of the binding updates.

In the movement detection process 412, the Router Advertisements, advertised in the network to which the Mobile Node is currently attached, are analyzed. A judgment is passed as to whether the network prefix of the network in which Router Advertisements are currently being advertised matches the last received network prefix.

Figures 5A, 5B, 5C:
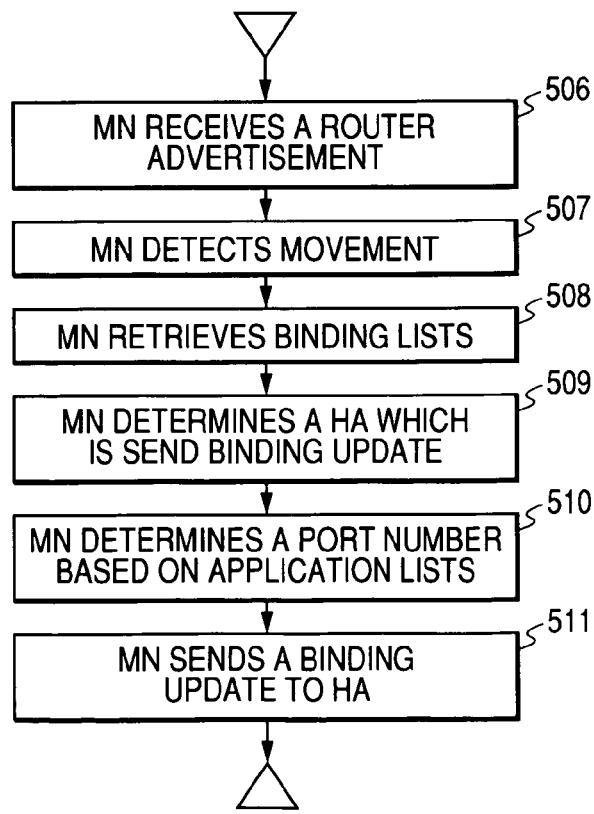
FIGS. 5A, 5B, and 5C are conceptual diagrams explaining the structure of the application list and the binding list.

The application list 413 is a table managing the correspondence relationships between the identifiers of the communicating applications and the addresses used in the Mobile Node. An example of an application list is shown in FIG. 5A. The application list 413 shows the correspondence relationships of the application IDs 502 and the addresses 501 used for communication by those applications.

The addresses and the protocols and port numbers used by the applications are allocated by the basic OS 408 when the applications are started. The basic OS 408 reports this information to the Mobile IP process 407. The Mobile IP process manages the reported information in application list 413.

An example of a binding list is shown in FIG. 5B. The binding list 414, being a list managing the transmission destinations of binding updates, includes a binding update transmission destination address 503, a Mobile Node care-of address 504, and a home address 505.

FIG. 5C shows the process flow of Mobile Node 102, 103. When Mobile Node 102, 103 receives a Router Advertisement (Step 506) and detects a network movement (Step 507), it consults binding list 414 (Step 508). It specifies the Home Agent and the home address transmitting the binding update from the binding list (Step 509). From the home address specified in Step 509, it retrieves the application list, specifies the port number and protocol associated with the home address (Step 510), and transmits the binding update (Step 511).

Figure 6:
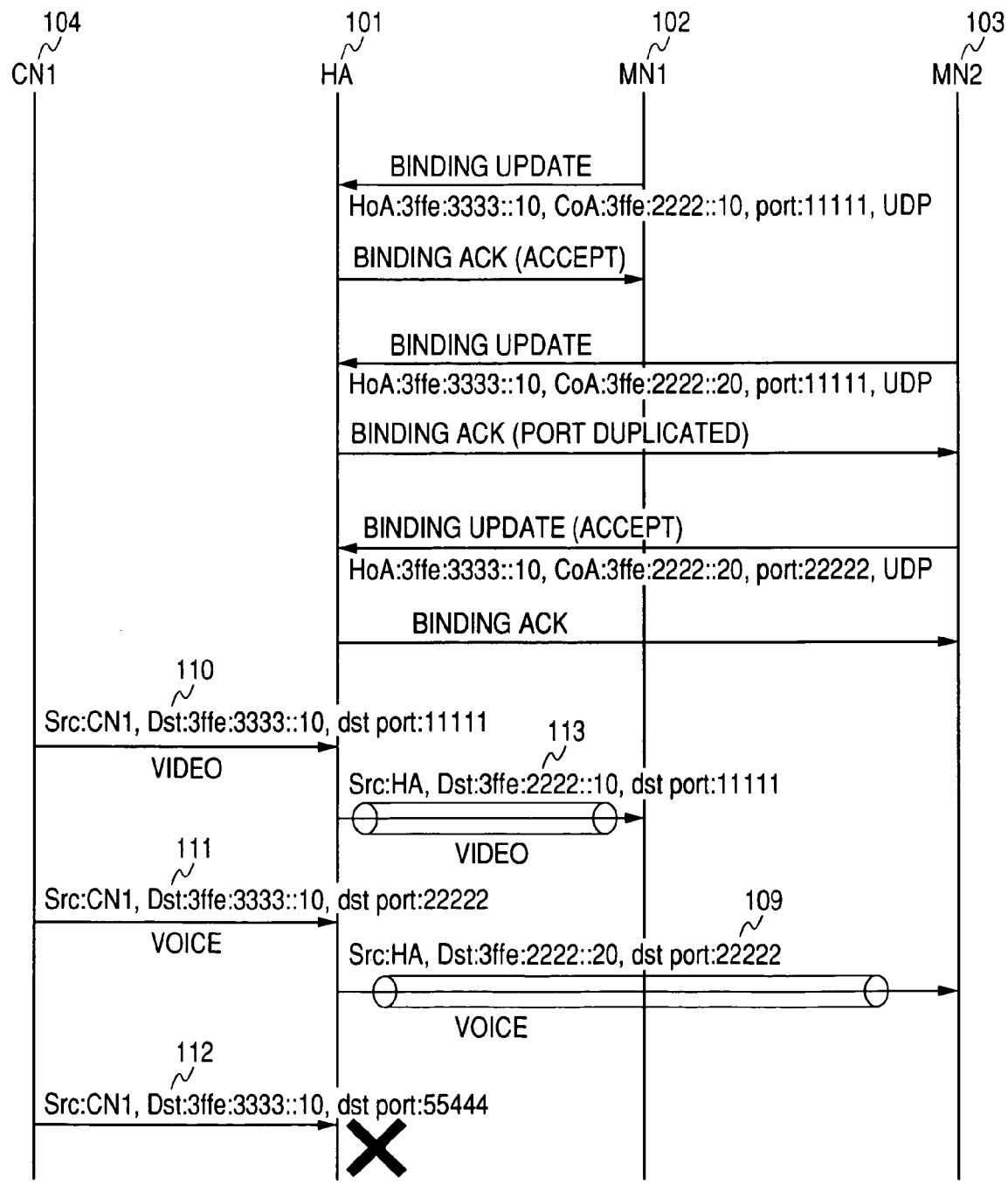
FIG. 6 is a diagram of the sequence in Embodiment 1.

FIG. 6 shows the communication sequence in the case of a Mobile Node communicating with a terminal not being a Mobile Node, by the address mapping method covered by the present invention. The above-mentioned communication sequence will here be explained with reference to FIGS. 1 and 6.

The first Mobile Node 102 will be considered to be a video receiving device and the second Mobile Node 103 will be considered to be a voice receiving device. The first Mobile Node 102 and the second Mobile Node 103 detect that they have moved to the first foreign network 108 and transmit a binding update to Home Agent 101.

At this time, first Mobile Node 102 and second Mobile Node 103, in addition to the care-of address acquired in the foreign network, at the same time report the port number and protocol type constituting the identifier by which an application can be specified.

Figure 7:
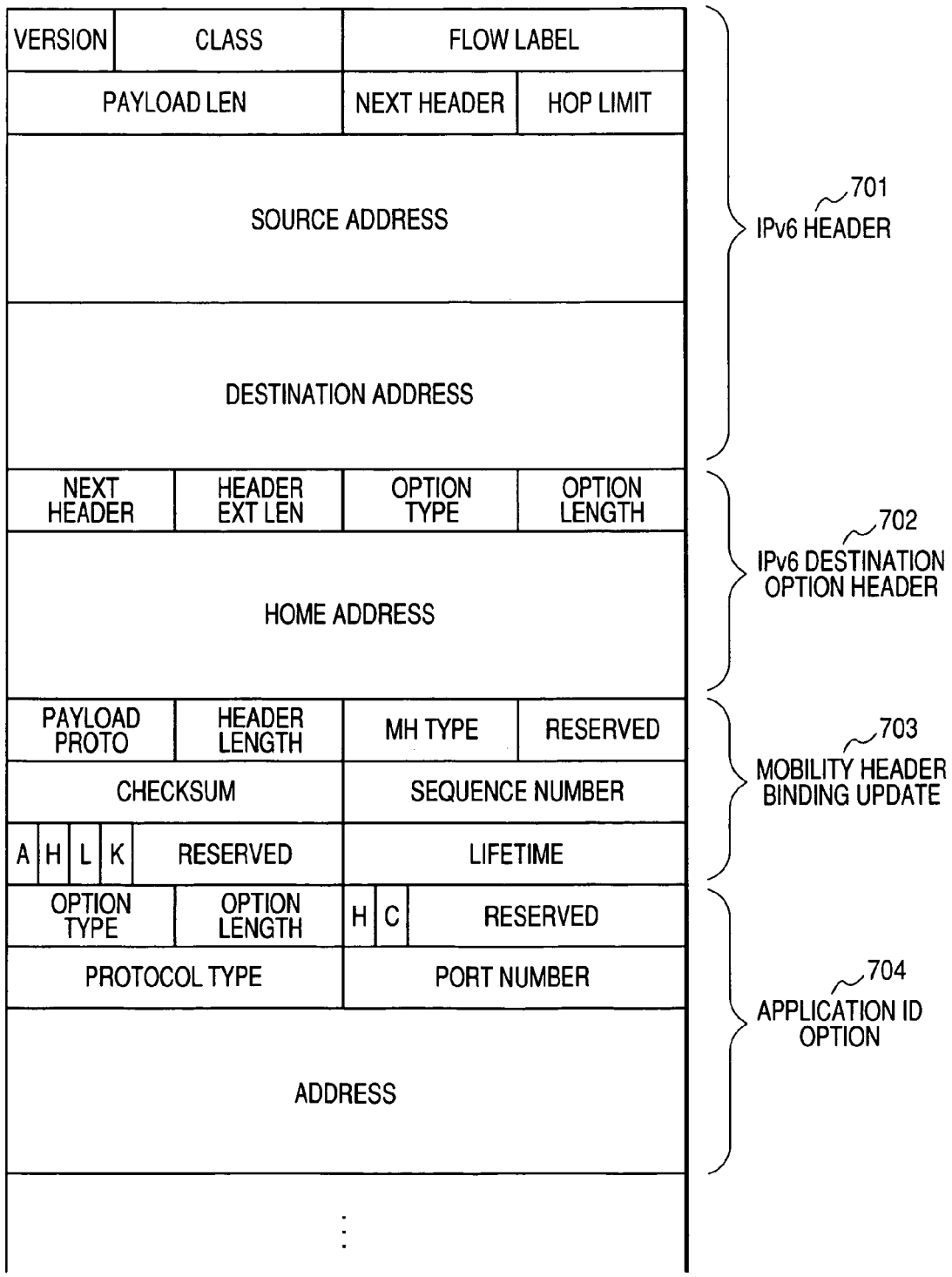
FIG. 7 is a diagram of the format of a binding update message used in the present invention.

FIG. 7 is an example of an expanded binding update. A normal Mobile IP binding update message is composed of an IPv6 header 701, an IPv6 destination option header 702, and a binding update mobility header 703. In the present invention, application ID options 704 are added to these messages and information on the applications used by Mobile Nodes 102, 103 is reported to Home Agent 101. Application information shows the protocol type and standby port number used by the application. In case the applications used in Mobile Node 102 are multiple, multiple application ID options are added, and all information on applications used by the Mobile Node are reported to Home Agent 101. Normally, in the address domain, a care-of address is set and a C bit is raised. In case the care-of address coincides with the source address of the IPv6 header, this may be omitted.

In FIG. 9B, there is shown the process flow chart of Home Agent 101 in the case of reception of a binding update. If Home Agent 101 receives a binding update (Step 909), the already registered binding cache is retrieved (Step 910), and a judgment is passed (Step 911) on whether the reported home address is already registered. If the reported home address is not already registered, the information reported to the binding cache is registered and the process is terminated (Step 916).

If the home address is already registered, a judgment is passed on whether the port number reported in the binding update duplicates the port number registered in the already registered home address (Step 912). In case there is no duplication, the information reported in the binding cache is registered and the process is terminated (Step 916).

If the port number is already registered, a judgment is passed on whether the interface ID of the care-of address reported in the binding update coincides with the interface ID of the care-of address registered in the already registered home address (Step 913). In case the interface ID coincides with the care-of address of the already registered home address, the binding cache is updated, and the process is terminated (Step 915). In case the interface ID does not coincide with the care-of address of the already registered home address, it is judged that this is a registration request from a Mobile Node different from the already registered Mobile Node. In the home address to which the registration request was made, a port number not yet used is selected, the port duplication option is set in the binding acknowledgement and the process is terminated (Step 914).

In the case of FIG. 6, since the home address 3ffe:3333::10 registered by first Mobile Node 102 is not already registered, a care-of address 3ffe:2222:: 10, a port number 11111, and a UDP protocol type are registered in the binding cache.

Moreover, in the case of second Mobile Node (103), concerning the home address 3ffe:3333::10, since the care-of address of first Mobile Node 102 is already registered in port number 11111, the registration triggers an error. The Home Agent 101, reporting that the registration has failed, transmits a binding acknowledgement message with a port duplication option included to second Mobile Node 103.

Figure 8:
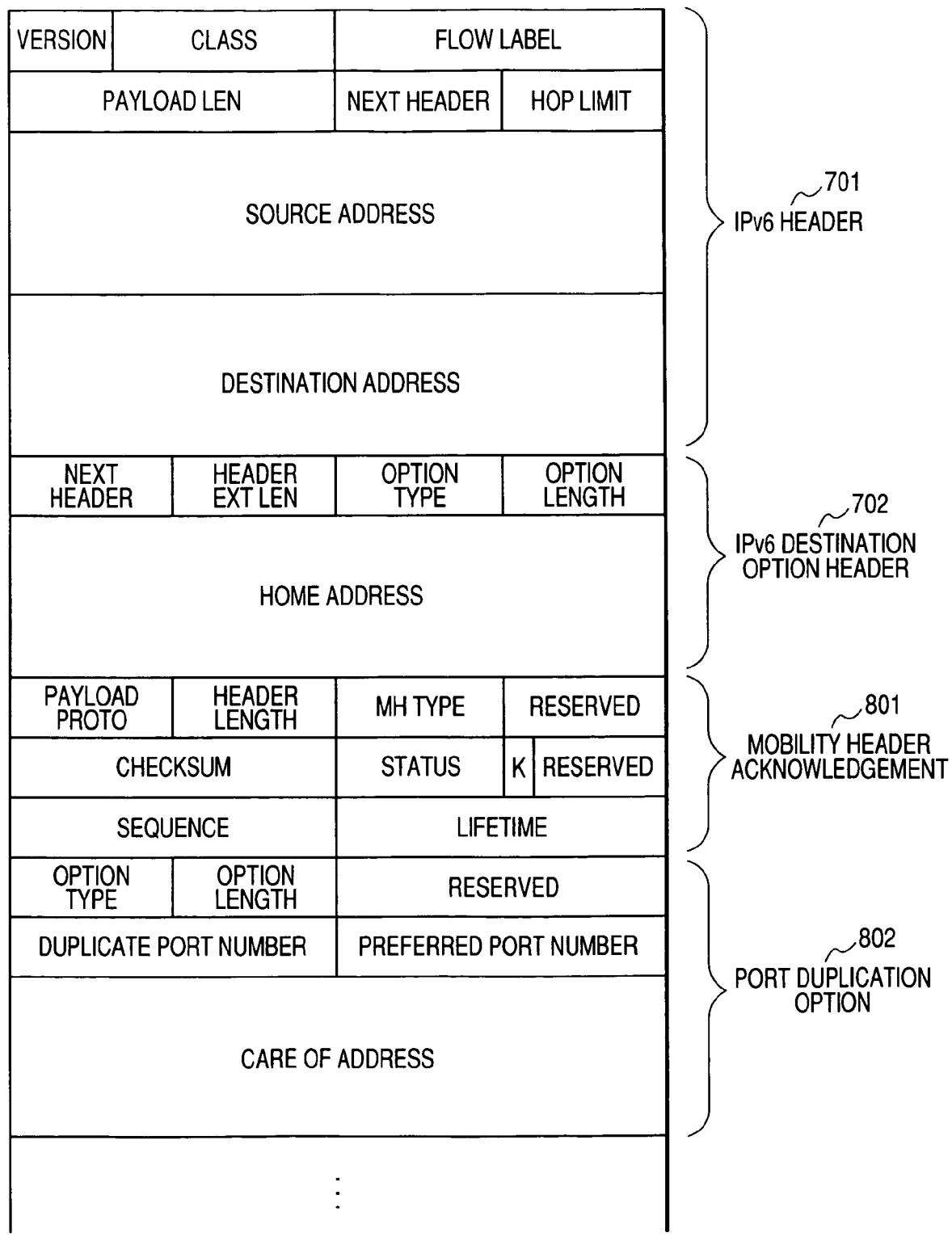
FIG. 8 is a diagram of the format of a binding acknowledgement message used in the present invention.

An example of a binding acknowledgement is shown in FIG. 8. A normal Mobile IP binding update message is composed of an IPv6 header 701, an IPv6 destination option header 702, and a binding update mobility header 801. In the present invention, a status information addition within the binding acknowledgement message 801 as well as a port duplication option 802 are defined. In the status information, a status number 140 and a port duplication error are added. In the port duplication option, the port number reported in the binding update and confirmed to duplicate that of an already registered terminal, and a port number not yet used and recommended for possible use by the Mobile Node are reported.

If second Mobile Node 103 confirms that the registration has failed, from the information reported in the binding acknowledgement, it uses the port number recommended by the Home Agent, and transmits the binding update for a second time.

The Home Agent 101 verifies that the port number is not duplicated and, concerning second Mobile Node 103, registers home address 3ffe:3333::10, a care-of address 3ffe:2222::20, a port number 22222 constituting the application ID, and the protocol type UDP.

A video packet 110 transmitted from terminal 104 and destined for home address 3ffe:3333::10 of Mobile Node 102 is captured by Home Agent 101.

FIG. 9A shows the flow chart in the case of a capture by Home Agent 101 of a packet destined for a Mobile Node.

When Home Agent 101 captures a packet destined for the Mobile Node (Step 901), it retrieves the binding cache (Step 902). If there is no hit in the binding cache, it destroys the packet (Step 908) and terminates the process. If there is a hit in the binding cache, the Home Agent analyzes the message header of the captured packet (Step 903), specifies the protocol type and port number of the header used in the transport layer (Step 904), and retrieves for a second time (Step 905) the retrieval result of the binding cache in Step 902 using the transport layer header and port number specified in Step 904, and, if there is no hit in the binding cache, destroys the packet (Step 908), and terminates the process. If there is a hit in the binding cache, the Home Agent selects (Step 906) the care-of address with a matching port number and transport layer protocol. The captured packet is encapsulated with the selected care-of address and forwarded to the Mobile Node (Step 907).

As shown in FIG. 6, when Home Agent 101 captures the packet 110 destined for the Mobile Node, it retrieves binding cache 213 and acquires the care-of addresses 3ffe:2222::10, 3ffe:2222::20. Concerning the home address 3ffe:3333::10, since there are multiple registered care-of addresses, the port number and the protocol type of the captured packet are compared with the port numbers and protocol types registered in the binding cache, and the care-of address 3ffe:2222::10, whose port number and protocol type match those of the captured packet, is judged to be the forwarding destination of the captured packet. The Home Agent 101 encapsulates the captured packet with the care-of address 3ffe:2222::10 and forwards it (as 113) to first Mobile Node 102.

The voice packet 111 transmitted simultaneously from terminal 104 and destined for 3ffe::3333::10 is captured by Home Agent 101. The Home Agent 101 retrieves binding cache 213 and acquires the care-of addresses 3ffe:2222::10, 3ffe:2222::20. Since multiple care-of addresses are registered in the binding cache, the protocol type and port number of the captured packet are compared with the protocol types and port numbers registered in binding cache 213. The packet 111 has the port number 22222. Among the care-of addresses registered in the binding cache, since the application ID having the care-of address 22222 is 3ffe:2222::20, this address is judged to be the forwarding destination. The Home Agent 101 encapsulates the captured voice packet with 3ffe:2222::20 and forwards it (as 109) to Mobile Node 103. Through this configuration and operation, it is possible, at the same time that terminal 104 can treat multiple Mobile Nodes using the same home address as one Mobile Node, to distribute data used in different applications such as e.g. video and voice to the Mobile Nodes handling the respective applications.

At the same time, the packet 112 transmitted from terminal 104 and destined for home address 3ffe:3333::10 is captured by Home Agent 101. The Home Agent 101 retrieves binding cache 213 and acquires care-of addresses 3ffe:2222::10, 3ffe:2222::20. Since multiple care-of addresses are registered in the binding cache, the protocol type and port number of the captured packet are compared with the protocol types and port numbers registered in binding cache 213. The packet 112 has the application ID 55444. Among the care-of addresses registered in the binding cache, the care-of address having the application ID 55444 does not exist. Therefore, Home Agent 101 discards the captured packet and does not forward it to the Mobile Node. Through this composition and operation, it is possible to improve security, since it is possible to block, i.e. to filter, illicit access to first Mobile Node 102 as well as to second Mobile Node 103.

2. Second Embodiment

Figure 11:
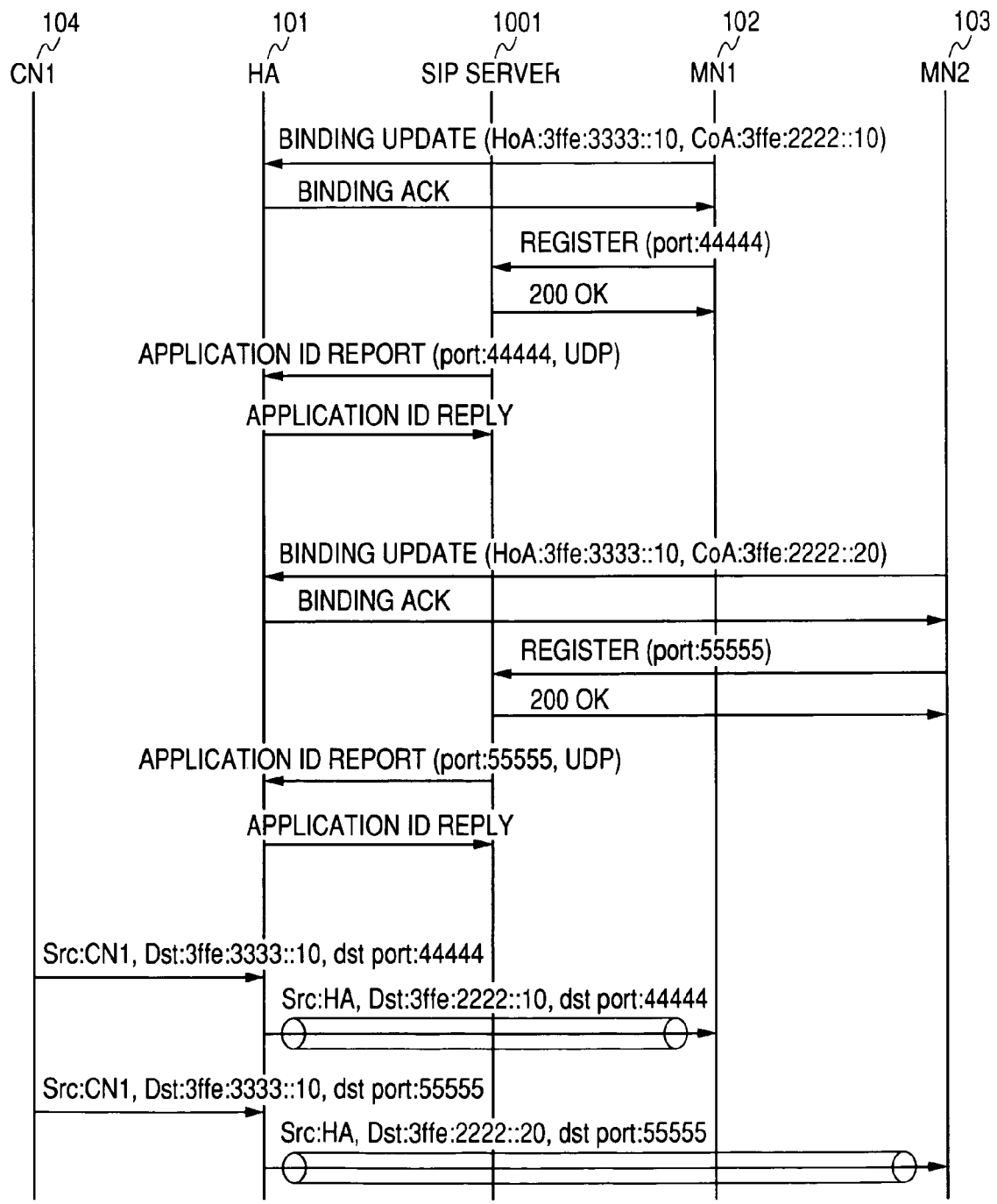
FIG. 11 is a sequence diagram explaining the situation for a network in which the presented invention is implemented, including cooperation with a SIP server.

An implementation mode of the present invention will be explained, in which a Home Agent cooperates with a SIP (Session Initiation Protocol) server and the like, without the incorporation of any modifications to the Mobile Nodes. FIG. 10 shows the configuration, and FIG. 11 shows the sequence, of a network in which the present invention is implemented. The SIP server 1001 may also be installed in a network other than home network 107.

The first and second Mobile Nodes 102, 103 shall be provided with a SIP User Agent function. In addition, first Mobile Node 102 is assumed to be a dedicated video receiving device and second Mobile Node 103 is assumed to be a dedicated voice receiving device.

The first Mobile Node 102 reports a REGISTER message to SIP server 1001 when the SIP application is initiated. The contact address and port number in the contact header field inside the REGISTER message are mandatorily included for transmission. In the contact address, both the care-of address and the home address are set. When the registration is complete, the SIP server transmits "200 OK" to the Mobile Node.

The SIP server having received the REGISTER message reports the application ID of first Mobile Node 102 to Home Agent 101.

Figure 12:
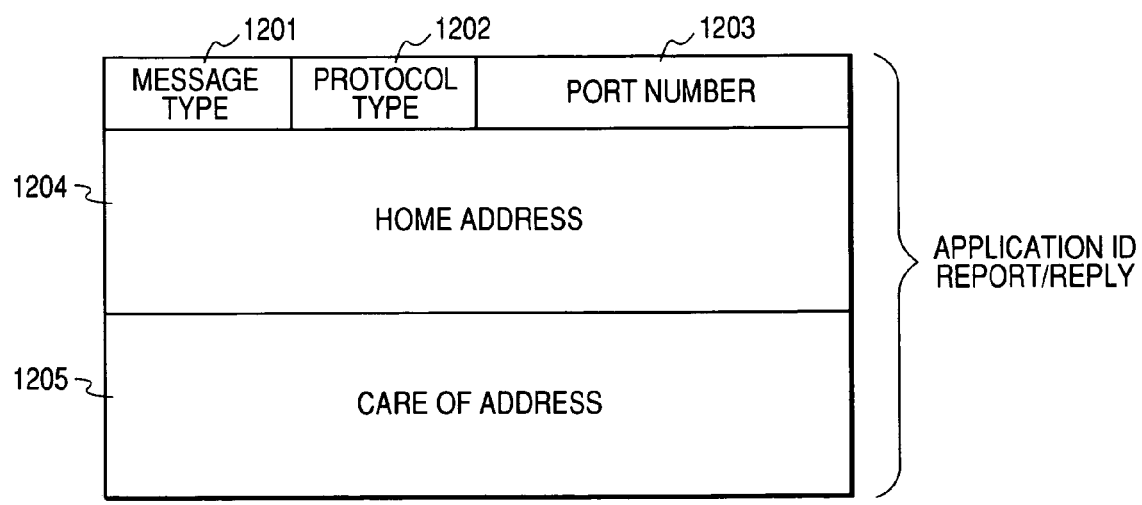
FIG. 12 is a conceptual diagram of the application ID report and reply message.

An example of an application ID report is shown in FIG. 12. In the application ID message, there are included a message type 1201 indicating whether the concerned message is a report or a reply, a protocol type 1202 used by the application, a home address 1204 used by the application, a care-of address 1205, and a port number 1203 allocated in the reported address. In case the protocol type is not assigned in the REGISTER message, it is set to UDP.

Figure 13A:
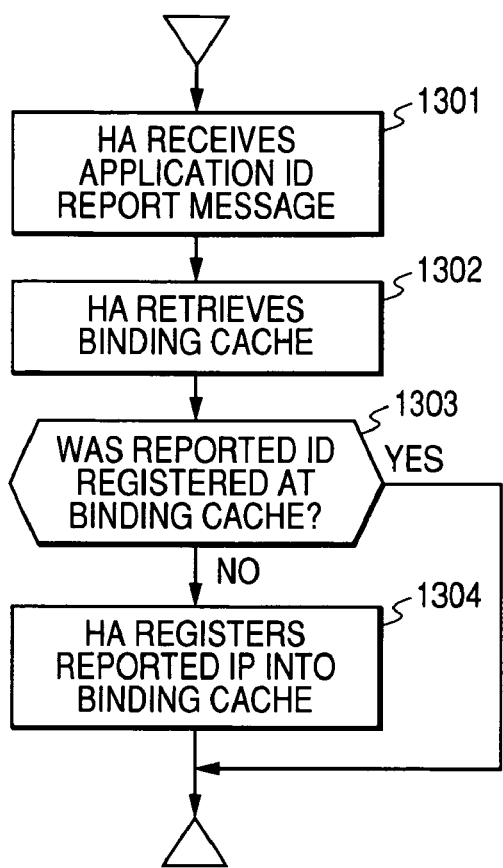
FIGS. 13A and 13B are flow chart diagrams of the application ID registration process of the Home Agent.

FIG. 13A shows the process flow of the Home Agent having received the application ID report message.

The Home Agent 101 receives the application ID report message (Step 1301). The binding cache 213 is retrieved (Step 1302) from the care-of address 1205 of the report message. As a result of the retrieval, it is determined (Step 1303) whether the port number reported in the application ID report is registered in the concerned binding cache, and, in case it is not registered, a registration is performed (Step 1304).

Hereafter, the procedure for forwarding in an appropriate way the packet transmitted by the terminal to Mobile Nodes. 102, 103 is the same as that in Embodiment 1.

Through the configuration and the operation on the present embodiment, it is possible for the Home Agent to acquire, without modifications to the conventional binding update format, the correspondence between the care-of address and the port number.

3. Third Embodiment

An implementation mode of the present invention will be explained, in which Home Agent 101 monitors packets transmitted and received by Mobile Nodes.

In the present embodiment, the Mobile Node operates as a normal Mobile IP Mobile Node and, when moving to a foreign network, the Mobile Node transmits the normal binding update to the Home Agent.

Figure 13B:
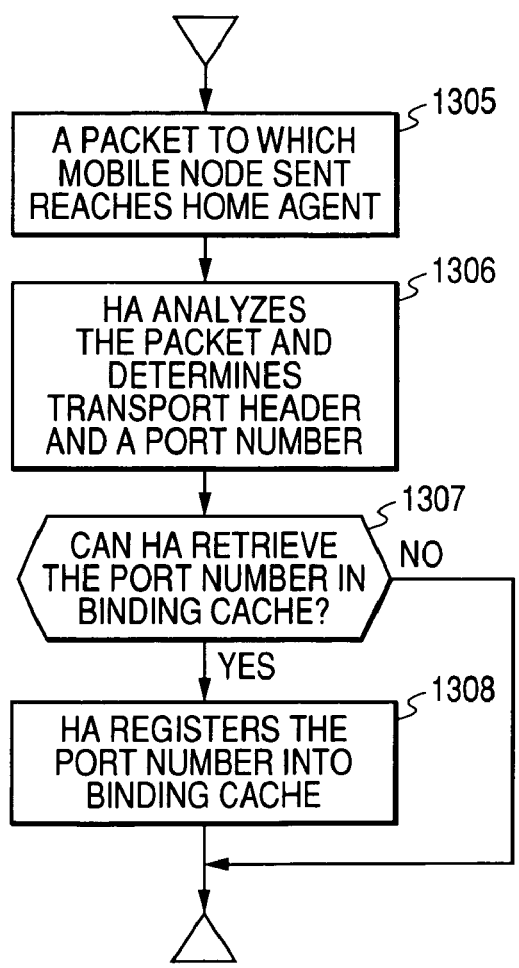

In FIG. 13B, there is shown the process flow of the application ID registration of Home Agent 101 in the present embodiment. The Home Agent monitors the packet transmitted by the Mobile Node. When the packet transmitted by the Mobile Node reaches the Home Agent (Step 1305), the Home Agent analyzes the header information of the transport layer of the packet transmitted by the Mobile Node, and, from the header of the transport layer used by the Mobile Node for communication, specifies the transport layer protocol type and source port number (Step 1306). It retrieves binding cache 213 in which the home address and the care-of address of the packet received from the Mobile Node is registered, and determines whether the port number and the transport layer protocol are registered in the concerned binding cache (Step 1307). In case there is no registration, the binding cache is updated to register the protocol type and the port number (Step 1308).

Regarding the packet transmitted from terminal 104 to Mobile Nodes 102, 103, the flow for selecting the appropriate care-of address is the same as that of Embodiment 1.

Through the configuration and the operation of the present embodiment, it is possible for the Home Agent to acquire, without incorporating any modifications to conventional Mobile Nodes, the correspondence between the care-of address and the port number.

4. Fourth Embodiment

Explanations will be given on an embodiment in which the filtering performed by the Home Agent in Embodiment 1 is performed by a gateway.

Figure 14:
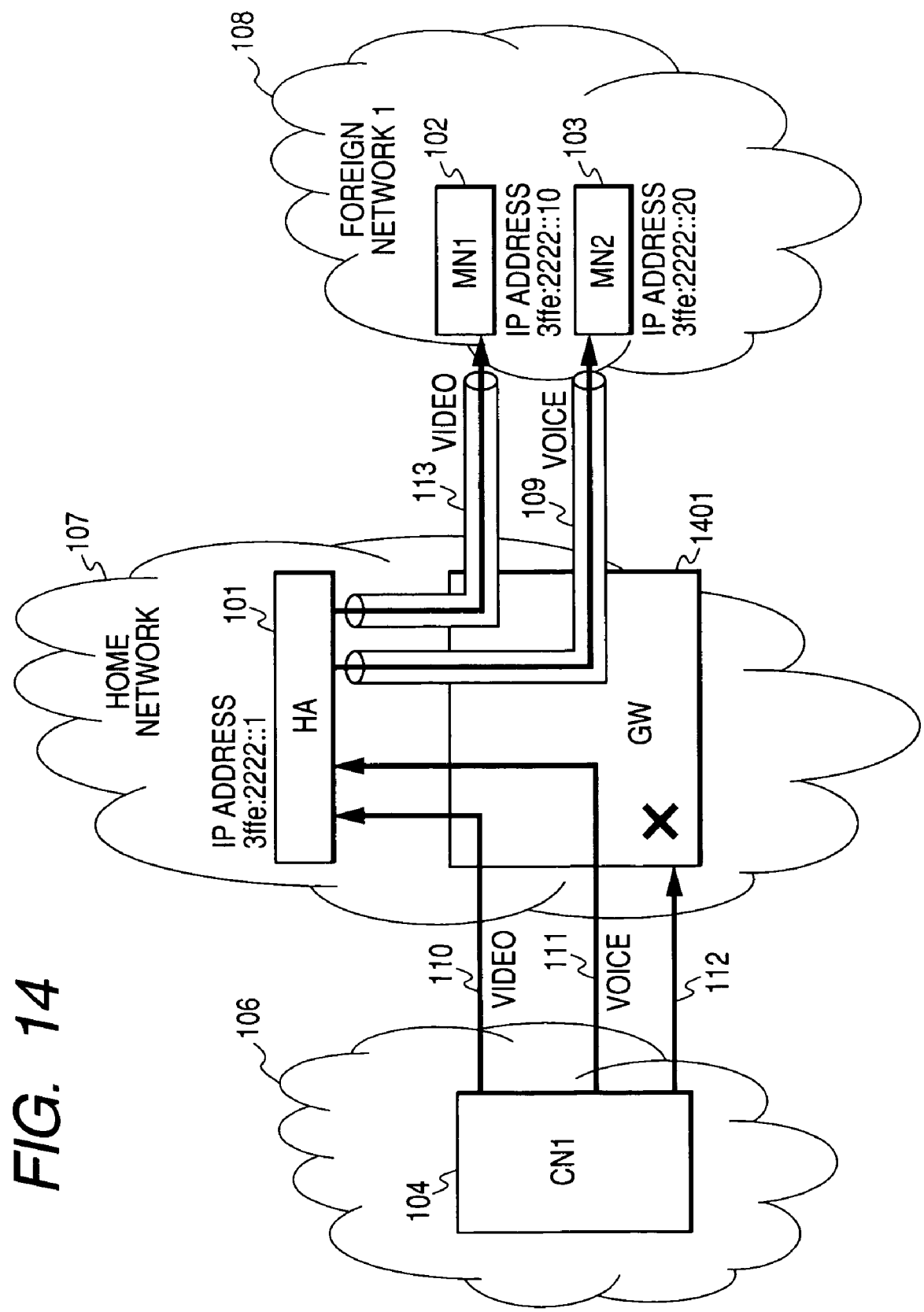
FIG. 14 is a conceptual diagram of the network in which the present invention is implemented, including cooperation with a gateway.

In FIG. 14, there is shown a network configuration in which the present invention is implemented. The Home Agent 101 is connected to Mobile Nodes 102, 103 and terminal 104 through a gateway 1401. In the initial state, gateway 1401 is set to forward all packets destined for the Home Agent (destination address 3ffe:2222::1) and to destroy all other packets.

FIG. 16A shows the process flow of the Home Agent. When the Mobile Node transmits a binding update, the binding cache of the Mobile Node is generated, in the same process as that of FIG. 9B. The Home Agent, taking the opportunity of the Mobile Node binding cache generation (Step 1601), sets gateway 1401 to release the packet filter (Step 1602) with the combination of the registered Mobile Node home address, transport layer header, and port number. Also, in case the binding cache has been deleted, the filter release setting of the gateway is deleted.

Figure 15:
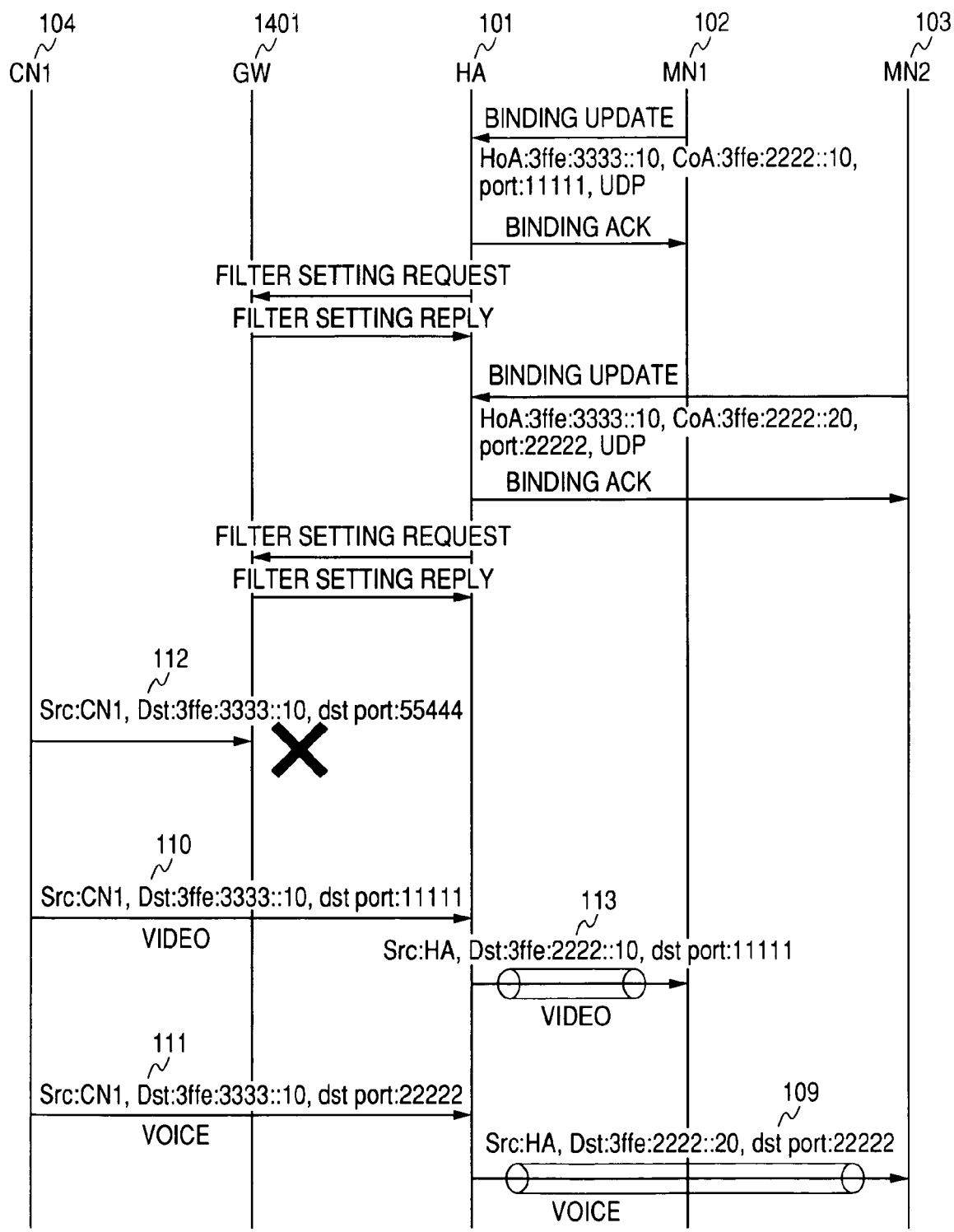
FIG. 15 is a sequence diagram explaining the situation for a network in which the presented invention is implemented, including cooperation with a gateway.

The sequence of the present embodiment is shown in FIG. 15. The gateway 1401 monitors transiting packets and forwards only packets for which a filter release is registered. Like packet 112 with the destination address 3ffe:3333::10 and the port number 55444, packets not registered in the gateway are discarded in the gateway.

In FIG. 16B, there is shown the process of Home Agent 101 in case it has captured a packet destined for the Mobile Node. If Home Agent 101 captures a packet destined for the Mobile Node (Step 1603), it analyzes the header of the captured packet (Step 1604) and specifies the port number of the transport layer header (Step 1605). The Home Agent retrieves the binding cache (Step 1606) on the basis of information on the home address, the transport layer header specified in Step 1605, and the port number, and selects a care-of address (Step 1607). The Home Agent encapsulates the packet with the selected care-of address and forwards it to the Mobile Node (Step 1608). In the present configuration mode, since packets that do not need to be forwarded to the Mobile Node are discarded in gateway 1401, there is no need for Home Agent 101 to perform the destruction of the packets.

Through the configuration and operation of the present embodiment, it is possible to improve security without letting the filtering function reside in the Home Agent, and it is also possible to prevent an inflow of illicit traffic into the home network.

5. Fifth Embodiment

Figure 17:
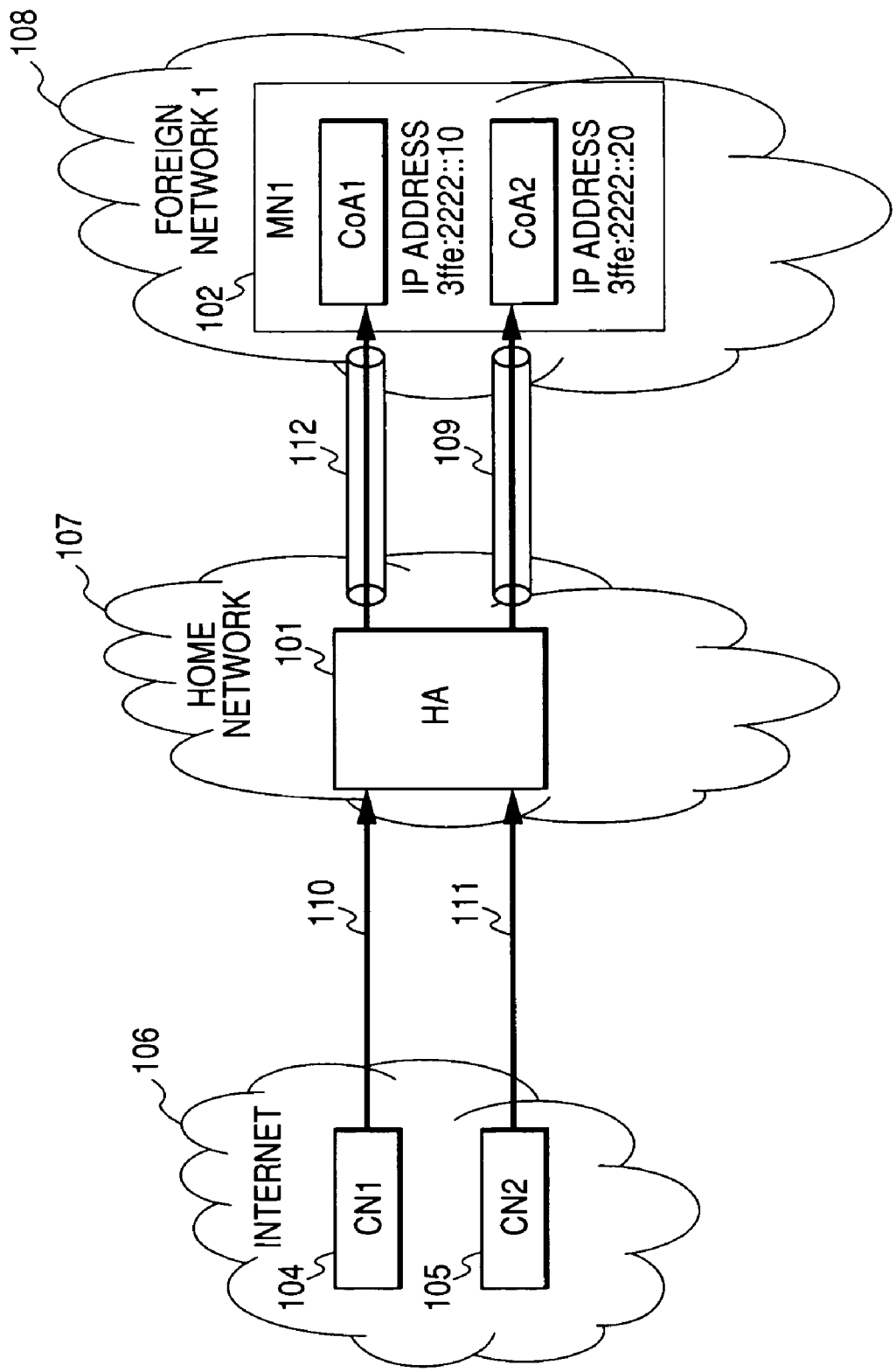
FIG. 17 is a conceptual diagram explaining the situation for a network in which the present invention is implemented, in the case that one Mobile Node holds multiple care-of addresses.

FIG. 17 shows the situation in which the present invention is implemented, in the case that one Mobile Node is given multiple care-of addresses.

In the present embodiment, it is possible to implement the present invention with the same procedure as that of Embodiment 1 by letting first Mobile Node 102 transmit a binding update per care-of address.

Through this configuration and operation, it is possible to distribute packets [by application] for multiple applications within one Mobile Node.

In addition, it is also acceptable for the first Mobile Node 102 to select a delegate care-of address from among the multiple care-of addresses that can be used for communication and integrate the binding updates into one message. In this case, the C bit for the application ID option is raised, and a care-of address per application is set in the address domain.

Regarding the other processes, they are the same as in Embodiment 1.

Through this configuration and operation, it is possible for the Home Agent to acquire, by one binding update, care-of addresses corresponding to multiple applications within the Mobile Node.

6. Sixth Embodiment

Figure 18:
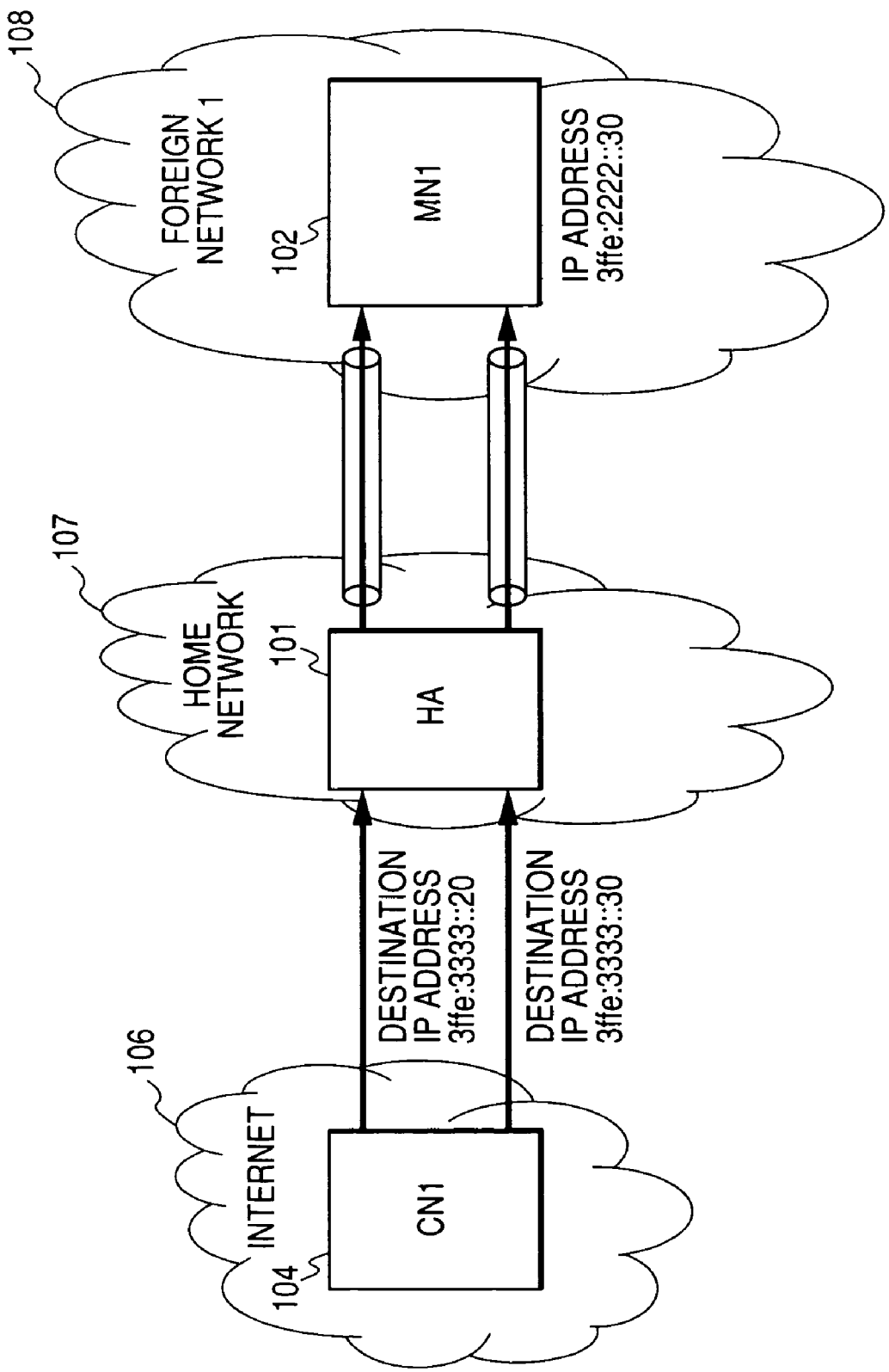
FIG. 18 is a conceptual diagram of a network in which the present invention is implemented, in the case that multiple home addresses are mapped to one care-of address.
Figure 19:
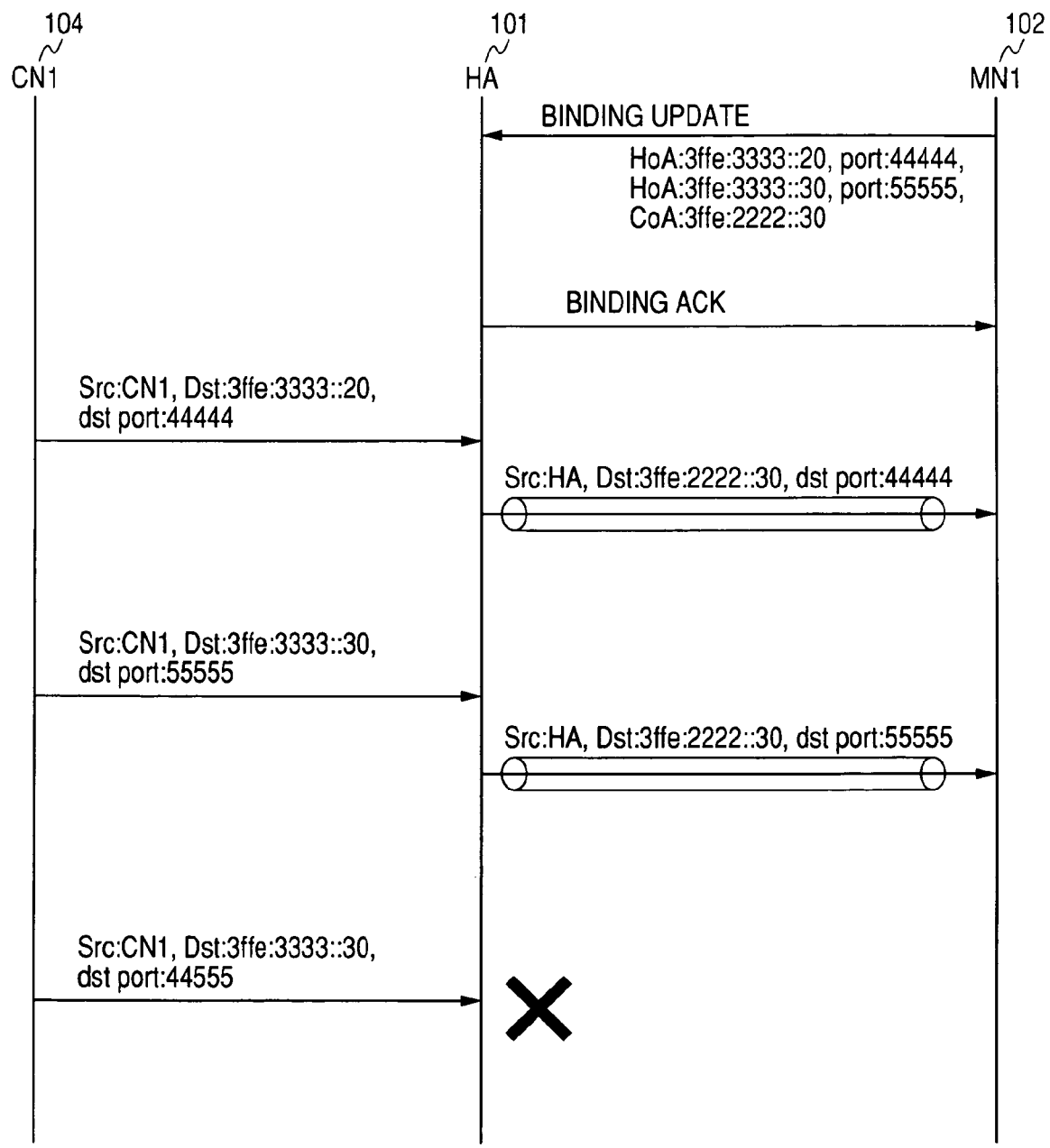
FIG. 19 is a sequence diagram explaining the situation in which the present invention is implemented, in the case that multiple home addresses are mapped to one care-of address.

FIG. 18 is a diagram of the network in the case of one care-of address being mapped to multiple home addresses, and FIG. 19 is a sequence diagram for this case.

The first Mobile Node 102, which uses multiple home addresses, transmits a binding update per home address to Home Agent 101. Moreover, it is also possible to transmit the binding updates in integrated form to Home Agent 101. In this case, transmission to Home Agent 101 is carried out after setting the home address and raising the H bit in the address domain of application ID option 704 given in the binding update.

Regarding the other processes, they are the same as those of Embodiment 1.

Through the configuration and operation of the present embodiment, the user of the Mobile Node can possess multiple home addresses in relation to one application or one care-of address and can suitably use these home addresses for different purposes.

7. Seventh Embodiment

The case in which the Mobile Node receives the offering of a push service will be explained.

Since a Mobile Node 102, 103, even at times other than a [network] movement detection, reports an application ID modification to Home Agent 101 at the time of an application list update (at the time of launching or ending the application), it transmits a binding update to Home Agent 101. In order to receive the push service, a dedicated application is necessary. Through the reporting of the application ID to Home Agent 101 when the application is launched, it is also possible to receive information pushed from unspecified terminals.

Regarding the other processes, they are the same as those of Embodiment 1.

Through the configuration and operation of the present embodiment, it is possible for the Home Agent to forward push service packets to the Mobile Node in conjunction with the launch of an application, and therefore to prevent the forwarding of unnecessary traffic.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A Mobile Node device connected via a network to a home agent server along with other Mobile Node devices, said device having
    a memory storing programs for applications, and application identifiers each identifying the corresponding one of the applications, and
    an interface configured to transmit to said home agent server one of the application identifiers as well as a care-of-address of the Mobile Node device according to Mobile IP,
    wherein a plurality of care-of-addresses, each of which is associated with an identical home address and a different application identifier, are respectively transmitted from said Mobile Node device and other Mobile Node devices to the home agent server and stored therein, and
    wherein said Mobile Node device sends a packet destined for one of the other Mobile Node devices to said home agent server, said home agent server selects one of said care-of-addresses which is stored therein and associated with an application identifier identical with an application identifier recorded in said packet, encapsulates the received packet with said selected care-of-address, and transmits the encapsulated packet to said one of the other Mobile Node devices corresponding to said selected care-of-address.

2. A Mobile Node device according to claim 1, wherein each of said application identifiers is a port number of a port set to be used by the corresponding application.

3. A home agent server connected via a network to a plurality of Mobile Node devices, said home agent server having
    an interface configured to receive from each of said Mobile Node devices an respective application identifier of an application which operates in said one Mobile Node device and a respective care-of-address of said one Mobile Node device according to Mobile IP, and a memory storing a plurality of said respective care-of-addresses each associated with an identical home address and a different application identifier, wherein, after receiving a packet destined for one of said Mobile Node devices and associated with the identical home address, said home agent server selects one of said care-of-addresses which is stored in the memory and associated with an application identifier identical with an application identifier recorded in said packet, encapsulates the received packet with said selected care-of-address, and transmits the encapsulated packet to one of said Mobile Node devices corresponding to said selected care-of-address.

4. A home agent server according to claim 3, wherein, when a packet destined for said Mobile Node device has been received, said packet is discarded in case said address corresponding to the application identifier recorded in said packet is not stored in said memory.

5. A server according to claim 3, wherein the application identifier recorded in a packet received from said Mobile Node device and the source address of said packet are associated and stored in said memory.

6. A home agent server according to claim 3, wherein said application identifier is a port number of a port set to be used by the corresponding application.

7. A communication system having a home agent server and a plurality of Mobile Node devices connected via a network, wherein each of said Mobile Node devices has a memory storing programs for applications and application identifiers each identifying a corresponding one of said applications and an interface configured to transmit to said home agent server one of said application identifiers and a care-of-address of the Mobile Node device according to Mobile IP, and said home agent server has an interface configured to receive from each of said Mobile Node devices a respective care-of-address and a respective application identifier, and a memory storing a plurality of said respective care-of-addresses each associated with an identical home address and a different application identifier, wherein, after receiving a packet destined for one of the Mobile Node devices and associated with the identical home address, said home agent server selects one of said care-of-addresses which is stored in the memory and associated with an application identifier identical with an application identifier recorded in said packet, encapsulates the received packet with said selected care-of-address, and transmits the encapsulated packet to one of Mobile Node devices corresponding to said selected care-of-address.

8. A Mobile Node device according to claim 1, wherein said applications include User Datagram Protocol (UDP) and Transmission Control Protocol (TCP).

9. A home agent server according to claim 3, wherein said application is User Datagram Protocol (UDP) or Transmission Control Protocol (TCP).

10. A communication system according to claim 7, wherein said applications include User Datagram Protocol (UDP) and Transmission Control Protocol (TCP).

11. A Mobile Node device according to claim 1, wherein said Mobile Node device has one home address, a plurality of care-of-addresses each corresponding to a different one of the identifiers of said applications without duplication.

12. A home agent server according to claim 3, wherein the home agent server ensures that said Mobile Node device is registered with one home address, a plurality of care-of-addresses each corresponding to a different one of the identifiers of said applications without duplication.

13. A communication system according to claim 7, wherein the home agent server ensures that said Mobile Node device is registered with one home address, a plurality of care-of-addresses each corresponding to a different one of the identifiers of said applications without duplication.

14. A communication system according to claim 7, wherein each of said application identifiers is a port number of a port set to be used by the corresponding application.

\* \* \* \* \*